(12) United States Patent
Ederer

(10) Patent No.: US 6,193,922 B1
(45) Date of Patent: Feb. 27, 2001

(54) METHOD FOR MAKING A THREE-DIMENSIONAL BODY

(75) Inventor: Ingo Ederer, Holzbauerstrasse 4, D-86911 Diessen (DE)

(73) Assignees: Ingo Ederer, Diessen; Notar Walter, Weissenham, both of (DE)

( * ) Notice: Subject to any disclaimer, the term of this patent is extended or adjusted under 35 U.S.C. 154(b) by 0 days.

(21) Appl. No.: 09/202,374

(22) PCT Filed: Apr. 14, 1998

(86) PCT No.: PCT/EP98/02154

§ 371 Date: Jun. 14, 1999

§ 102(e) Date: Jun. 14, 1999

(87) PCT Pub. No.: WO98/46415

PCT Pub. Date: Oct. 22, 1998

(30) Foreign Application Priority Data

Apr. 13, 1997 (DE) ................................ 197 15 582

(51) Int. Cl.⁷ ........................... B29C 35/08; B29C 41/02
(52) U.S. Cl. .......................... 264/401; 264/221; 264/236; 264/308; 264/317; 264/496; 264/497
(58) Field of Search .................... 264/221, 236, 264/308, 317, 401, 496, 497

(56) References Cited

U.S. PATENT DOCUMENTS 5,503,785   4/1996   Crump et al. .................. 264/308 X

FOREIGN PATENT DOCUMENTS

| 43 05 201 C1 | 4/1994 | (DE) . |
|---|---|---|
| 44 00 523 A1 | 7/1995 | (DE) . |
| 44 36 695 C1 | 12/1995 | (DE) . |
| 195 38 257 A1 | 4/1996 | (DE) . |
| 195 28 215 A1 | 2/1997 | (DE) . |
| 195 15 165 C2 | 3/1997 | (DE) . |
| 322 257 A2 | 6/1989 | (EP) . |
| 490 546 A1 | 6/1992 | (EP) . |
| 581 445 A1 | 2/1994 | (EP) . |
| 686 481 A1 | 12/1995 | (EP) . |
| WO 95 05935 | 3/1995 | (WO) . |
| WO 96 12 610 | 5/1996 | (WO) . |

Primary Examiner—Leo B. Tentoni
(74) Attorney, Agent, or Firm—Jiawei Huang; J. C. Patents

(57) ABSTRACT

The present invention relates to a method for making a three-dimensional body, the construction of which is realised in layers by a purposeful application of material. According to the invention, two different materials are applied to each layer. One is purposeful applied in line along the outer edge of the three-dimensional object in the corresponding section plane, the remaining surfaces being filled with the second material.

17 Claims, 5 Drawing Sheets

METHOD FOR MAKING A THREE-DIMENSIONAL BODY

BACKGROUND OF INVENTION

1. Field of Invention

The invention is based on a method for making a three-dimensional body from a computer data model by computer-controlled layer-wise deposition of material.

2. Description of Related Art

The continued intensification of international competition with ever-decreasing product cycles calls for reduction of development time. Rapid production of prototype models yields a great cost reduction potential during all design and development phases, Existing methods for computer controlled manufacturing of three-dimensional objects can be categorised into subtractive and additive methods. The most popular method of the first group is numerically controlled milling. Disadvantages result from geometrical restrictions even with up to five axes milling. This method is inherently expensive, especially for single pieces, and requires suitable equipment together with a trained operator.

The second group comprises newer methods like e.g. stereolithography. Here a container with liquid photopolymer resin with constant fluid level is equipped with a mechanical fixture, which allows for lowering of a submerged platform according to a desired layer thickness. In a first step, a resin film of exact thickness is being applied on the submerged platform by a wiper (doctor blade). In a subsequent step, the resin film is being cured in selected areas by radiation from a UV laser. Hereby the laser beam scans across the resin surface under computer control, exposing contour lines, solid areas, and supporting structures to UV radiation. The next step comprises lowering the platform in the resin container by one layer thickness, applying another resin layer, and repeating the radiation exposure for the desired geometry of this layer. This cycle is repeated until completion of the object. Finally the model is being removed from the resin bath, cleaned from residual uncured resin, and separated from the supporting structures.

This method is primarily limited by its high expenses for equipment, process, and consumables. Additional equipment for cleaning of the models from liquid resin is mandatory.

EP-A-0 322 257 discloses a similar method in which a photosensitive material is being exposed to radiation through a computer generated mask in a layer-wise fashion. Subsequently unexposed material is being removed and substituted by an non-photosensitive material. The process is repeated layer by layer until completion of the model.

This method requires expensive cleaning equipment for removal of unwanted material during each layer cycle, yielding a large amount of still reactive waste, This disadvantage is avoided by methods like selective laser sintering, disclosed in U.S. Pat. No. 4,247,508. Here a thin powder layer is being applied to the building platform and selectively melted by a computer controlled scanning laser beam. Again, the cycle is repeated until completion of the model. Plastic or metal powders can be used. If designed skilfully, the loose powder can serve as supporting means. Therefore blowing off of unmelted powder after completion of the building phase is sufficient in order to get the finished model.

But this method requires expensive lasers, optics, and scanning devices as well. Furthermore, a certain degree of surface roughness of the models is caused by the granularity of the powder (ca. 50–100 micrometers average grain diameter).

A similar method, developed by the Massachusetts Institute of Technology and disclosed in EP 0 431 924 B1, applies thin powder layers on a substrate in which powder particles are bonded together according to the desired model cross-section by selectively adding small glue droplets via a printhead. The building material consists of bonded powder particles; unbonded powder acts as support and is being removed after completion of the process.

This method is used predominantly for building moulds for investment casting together with ceramics and has some disadvantages caused by the complex powder handling procedures. Moreover, the models always consist of a powder-binder composite which never achieves the bulk material density and therefore is mechanically weak, In "Ballistic Particle Manufacturing" of the BPM company molten material is being deposited from a single nozzle which is being positioned by a five-axis unit. Supporting structures can be omitted. The method is time-consuming, because only one nozzle is used for material deposition. To save time, only hollow bodies are being made today. Another disadvantage results from uneven material distribution, which leads to a deeply grooved object surface.

WO 95/05943 is based on dosing two different materials via drop generators, where the first material generates a model cross-section, the second a support structure where needed. Upon completion of the building phase the support structure is being removed by submersion in a solvent. This step yields the finished model which consists of insoluble material.

This technique has its advantages when building subtle structures, but the process is very slow because of the two dosing steps, leading to unacceptable building times. Moreover, material properties are very limited by the current maximum temperature of 80 degrees Celsius in the dosing head.

In EP 0 500 225 B1 a method is disclosed which also uses two different materials. The first material is used for building the model by selective dosing with a dosing head. The second material, whose application method is not specified, yields a support structure.

Here, too, the disadvantage holds that the building material must be compatible with the dosing heads, reducing the choice of materials and quality. The dosing process is technically demanding, because the building material must be pre-heated. Large models are enormously time consuming for the large amount of selectively deposited material.

SUMMARY OF THE INVENTION

Considering the problems described above which are associated with current methods, it is the objective of the invention to create a method for rapidly making three-dimensional objects with low technical effort which is suited for operation in an office environment.

This objective is achieved by a method for making a three-dimensional body comprising the properties laid down in the first claim.

According to the present invention a three-dimensional body can be made in the following steps:

a) Applying a release agent in its liquid state onto selected areas of a building platform by a single-drop generator, using a pattern according to the cross-section of a thin-walled shell around the three-dimensional body, and a grid pattern across the remaining area of the building platform.

b) after completion of the pattern for the current layer, filling of the areas enclosed by the release agent with a curable resin.

c) Curing of the resin.

d) Smoothing and planing of the layer in order to expose the upper surface of the release agent.

e) Repeating of the steps a) to d) with patterns according to the current cross-section of the three-dimensional body, thereby making the body itself.

f) Removing the structures not belonging to the body by dissolving the release agent.

The method according to this invention can be realised by a device for making three-dimensional bodies directly from computer data which consists of:

A microcomputer for data processing and control of the building process, a building platform which can be moved vertically in a stepwise fashion, a dosing device for selective application of the release agent, comprising positioning actuators, which can be moved across the building platform under computer control so that release agent can be applied at any point, a dosing device for uniform and rapid application of resin across the entire building platform, a device for curing of the resin and a device for smoothing and planing of the completed layer made up of release agent plus resin.

The advantage of the present invention in comparison with the state of the art consists of the combination of a selective material deposition, mostly in lines and a non selective, rapid application of resin for filling up the layer. Due to the application of the release agent in small regions during the first step the whole process will be accelerated significantly.

Moreover, the differentiation between building and support material can be neglected because both structures will be formed by the same material during the rapid application of the resin. The differentiation is made due to the location of the material, either it is located inside the region enclosed by the border corresponding to the section plane of the object and therefore building material, or outside the border and therefore support material. The applied release agent is the preposition for this decision. Therewith the process is significantly faster than all the processes described above.

The building of a cavity is possible by filling the release agent layerwise in regions which belong to the cavity volume. By solving the release agent after the process, extracting the object and emptying the cavity through a provided hole the designated object will be demoulded.

Due to the use of a inkjet like drop-on-demand dosing device for the application of the release agent, cost-effective and accurate systems can be designed which will reduce the overall system price.

Additionally the choice of different building materials is much wider than with the processes described above, because material properties like viscosity and surface tension in the liquid state are affecting the application much less. Due to that, objects with much better properties like rigidity, stiffness, hardness and surface quality can be made.

Because of the wide choice of materials, it is possible to find material combinations which will produce less emissions during the building process and which are not affective to skin. Due to that, the most important requirement for an office compatible device is fulfilled.

After the process the complete building volume is taken from the device as a solid cube. Therefore no special handling devices are necessary. There is no loose particle material or unhardened resin which can pollute the environment or affect the user.

With a suitable composition of a release agent the removal of the non-object-parts can be done without any tools. According to the present invention solving of the release agent is possible by a solvent, preferably water or by means of heat.

Due to the complete hardening of the resin there is no hazardous waste.

By means of the present invention any object geometry can be produced in short time and without use of other means, provided that object defining three-dimensional computer data exist, for example CAD-data, Other data sources can be used as well, for example data out of three-dimensional scanners.

The data of the desired object will be transferred to the control computer which adds a thin-walled, closed shell to, the object geometry. Subsequently the shell will be sliced perpendicular to the building axes according to the current progress. To facilitate demoulding of the object after the process a thin-walled grid structure will be added to the present slice data covering the whole building area. These geometry data will be plotted onto the building platform using the release agent. Preferably the release agent will be applied by means of a computer controlled droplet generator similar to drop-on-demand ink-jet printers. For that a dosing head with one or more nozzles will be fitted to a pair of axes which are perpendicularly movable to each other and are capable of positioning the droplet generator to any point of the building area. The liquid release agent in the heated dosing head will congeal immediately after impact on the building platform due to cooling, Because of increased surface tension and viscosity in the solid state a melting of the release agent will be avoided. Thus, a three-dimensional frame of the current object contour and the additional grid structure will be generated. The height of this release agent frame above the existing plane defines the slice height.

After completion of the release agent application the resin application starts under computer control. This can be done in several ways, One possibility is to move a resin reservoir with a defined orifice across the platform. Through the orifice a defined amount of resin will be applied on the building platform.

Another solution concerns dispensing a certain amount of resin from a reservoir at one edge of the platform across the entire building platform by means of a blade analogous to silk-screen printing, or a roller.

Also possible is a dispensing of the resin by means of a silk-screen. The silk-screen will be positioned in a certain height above the platform which represents the slice height. A predefined amount of resin will be applied to the silk-screen and subsequently pressed through by means of a Rakel.

In all of these processes it is necessary to ensure a tight contact between release agent and resin. The height of the resin must be at least corresponding to a slice height. After or during the application of the resin the resin will be hardened. This is possible by means of a temperature dependent phase change or a curing reaction of the resin, The curing reaction can e.g. be initiated by introducing a hardening agent when applying the resin or by radiation introduced by means of an appropriate device.

In the next step the layer thickness is adjusted and excess material is removed, e.g. by means of a sucking device. It is important to make sure that the surface of the release agent is bare after removing the excess material, such that in the next step a direct contact between the release agent layer introduced next and the already existing release agent structure can be realised. The adjusting of the layer thickness can be realised by means of an appropriate milling cutter or a moving cutting edge of an other type. By appropriately carrying out the step of depositing the resin the adjusting can be omitted completely or can be carried out only after a number of layers has been built in order to control the work tolerance in the vertical direction. To permit that the adjusting steps can be omitted or the number of adjusting step can be reduced, it has to be avoided that resin material is deposited on the release agent or flows due to surface tension effects.

In the following step the building platform is lowered by a distance corresponding to the layer thickness and, the geometrical data of the cross section in the next cutting plane of the thin-walled shell around the three-dimensional body is processed in the control computer. The process is restarted beginning with the applying of the release agent.

The above described process is repeated until the last layer is completed. Then the complete material block filling the building volume is taken off the building device and those parts of the resin which do not belong to the three-dimensional body and which have served as a support for the three-dimensional body are separated along the bordering release agent. Then the three-dimensional body can be cleared from rests of the release agent. The clearing can be carried out by means of a solvent, preferably by means of water, moreover, cavities filled up with release agent can be cleared through bores which already existed or which are manufactured for this purpose.

BRIEF DESCRIPTION OF THE DRAWINGS

In the following the invention is explained referring to the enclosed drawing.

In the drawing.

DESCRIPTION OF THE PREFERRED EMBODIMENTS

Figure 1A:
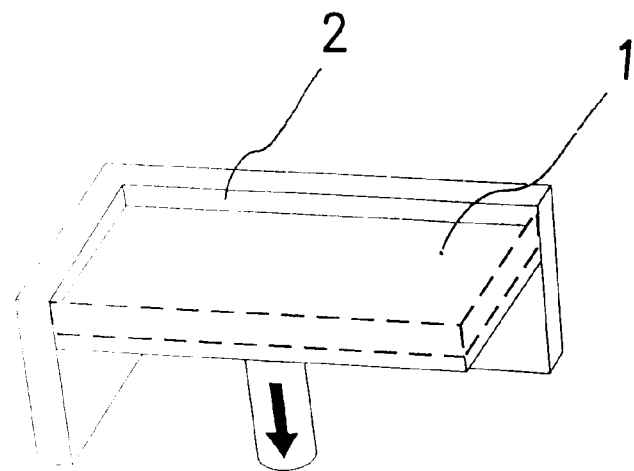
FIGS. 1a–1f show perspective views of the steps of the process.

FIG. 1a shows the movement for lowering the building platform 1 within the building box 2 of the building device by a distance corresponding to the layer thickness.

Figure 1B:
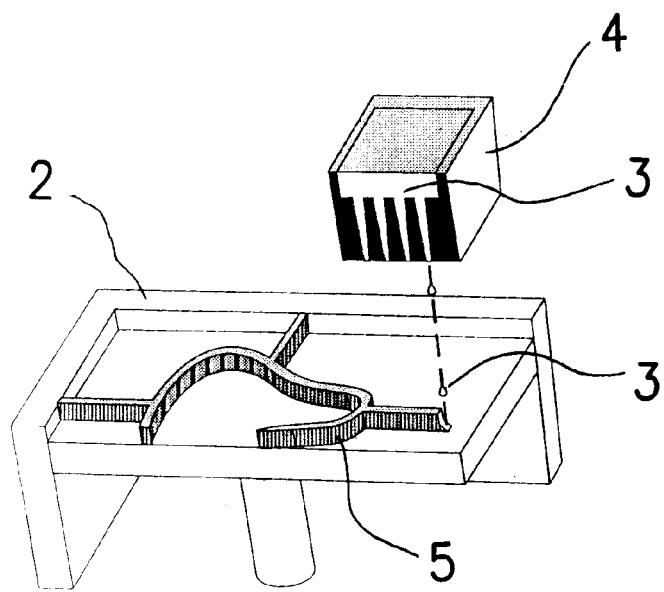

Then, FIG. 1b shows the applying of a release agent 3 by a single-drop generator 4 onto selected areas, wherein a pattern according to the cross-section in the respective height level of a thin-walled shell 5 around the three-dimensional body 6 is generated. Moreover, further release patterns 5 are deposited extending to the walls of the building box 2.

Figure 1C:
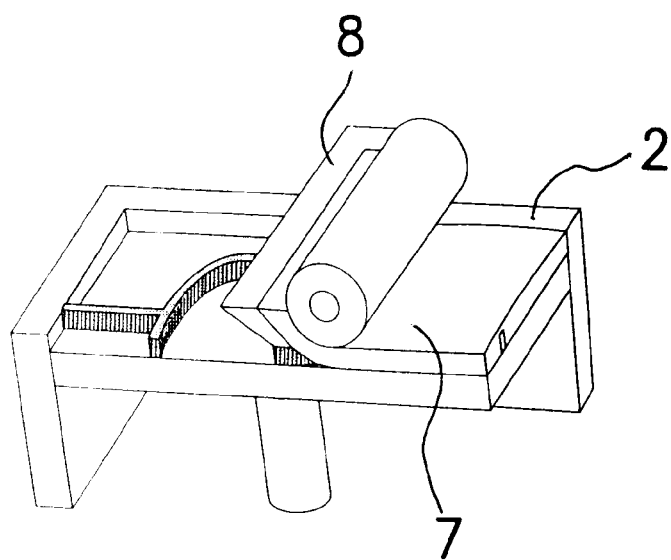

FIG. 1c shows the filling of the layer within the building box 2 with a curable resin 7 by means of the dosing device 8.

Figure 1D:
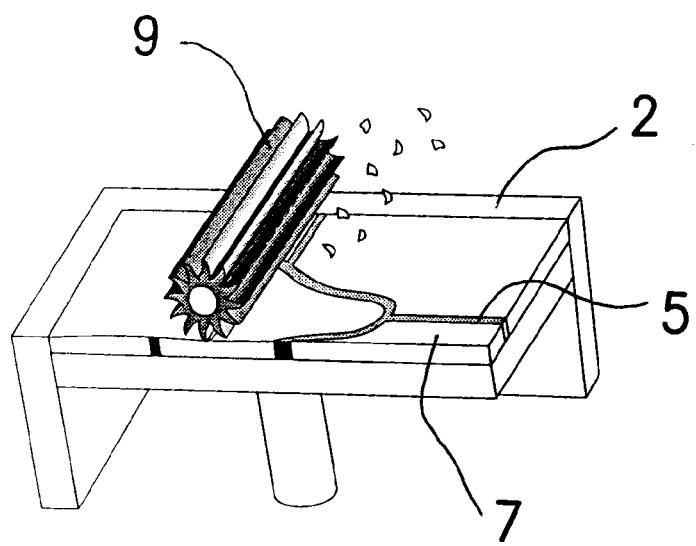

Then, as shown in FIG. 1d, the layer thickness is adjusted by a removing process carried out by means of a rotating cutter 9, such that the release patterns 5 are cleared and get a bare surface again.

Figure 1E:
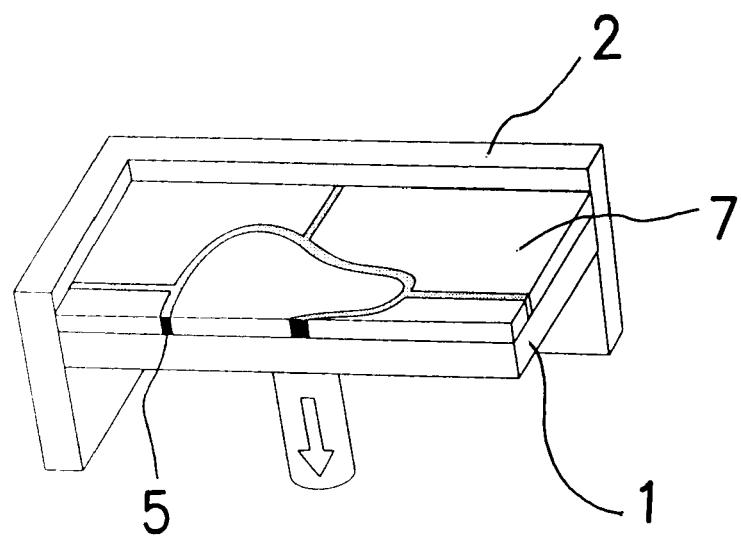

FIG. 1e shows the next lowering of the building platform 1.

The processes shown in FIGS 1b to 1e are repeated as often as required until the complete three-dimensional body 6 is formed of thin layers of the resin material 7. Then, the three-dimensional body embedded in further parts consisting of resin material is completely taken off the building box 2 and is separated from the further parts.

Figure 1F:
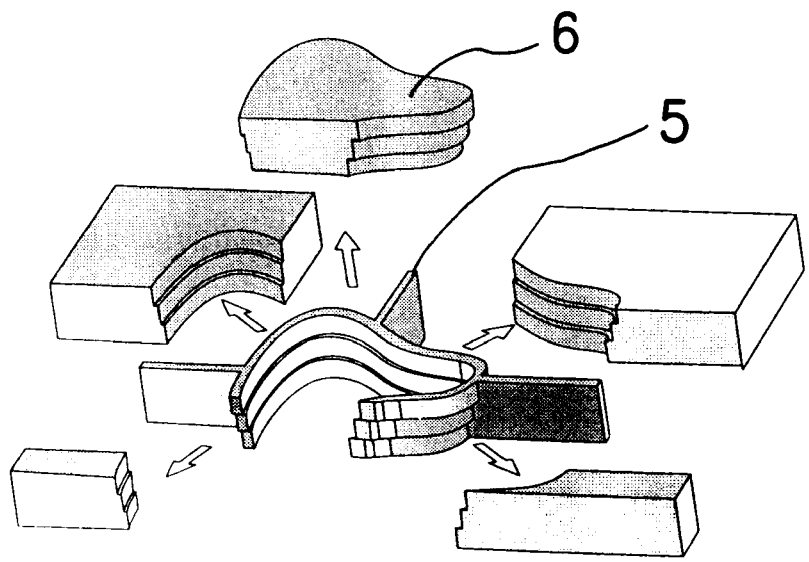

FIG. 1f shows the separating of the three-dimensional body 6 by means of removing the parts exterior of the bordering release patterns 5.

Figure 2:
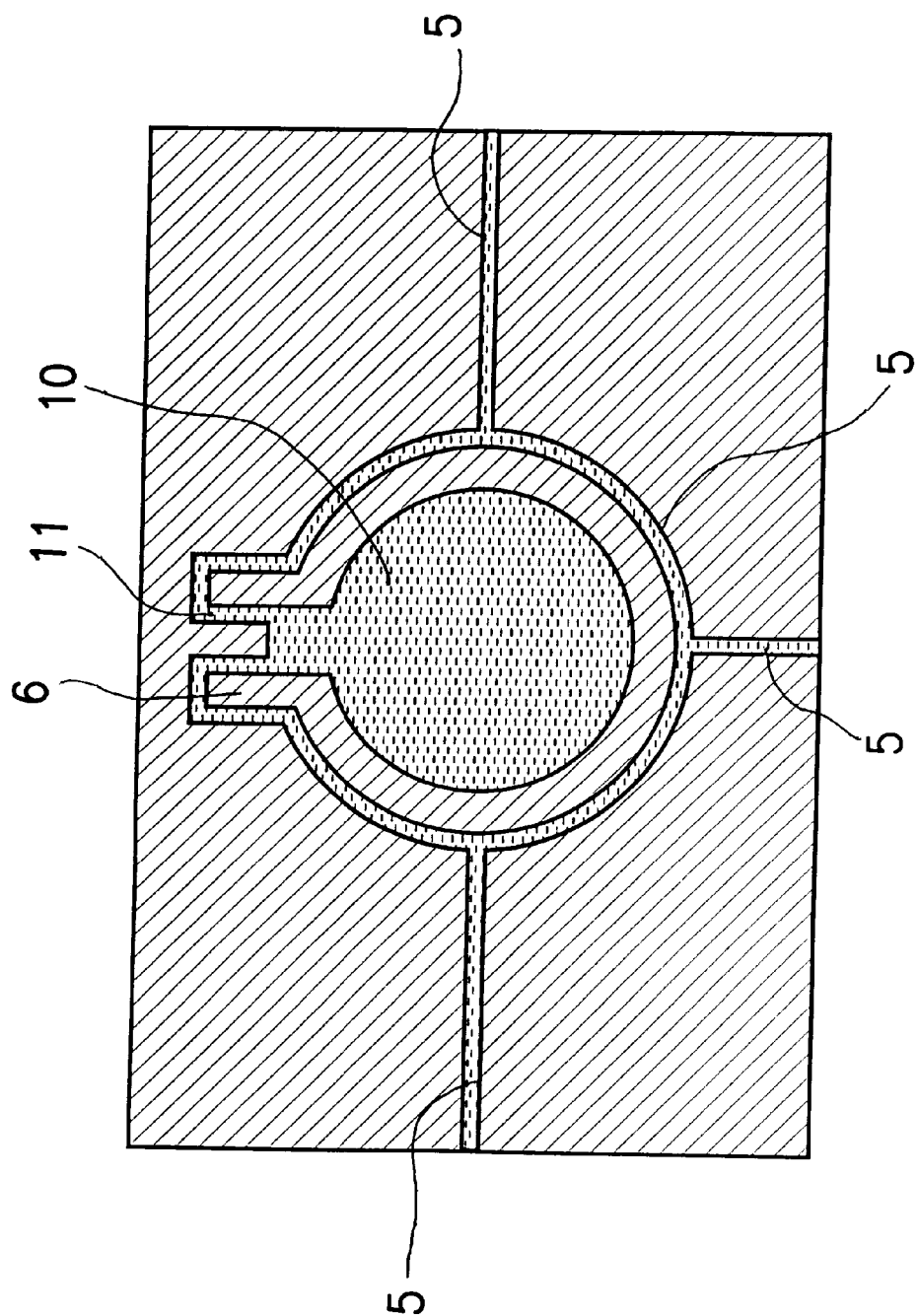
FIG. 2 shows a plan view of a slice of the three-dimensional body having a closed cavity from which material not belonging to the body cannot be removed.

FIG. 2 shows the plan view on a cross section of the three-dimensional body 6, which cross section is given as an example and shows a core 10 which cannot be removed. In order to clear the cavity from the core after terminating the process the core is made of the release agent 3. After termination of the process the release agent 3 is dissolved in this area and is removed through an opening 11. The release patterns 5 can be clearly seen, which serve as aids for separating the three-dimensional body 6 from other parts after the termination of the process. Due to the release patterns even three-dimensional bodies 6 comprising an undercut can be separated from the other parts.

Figure 3:
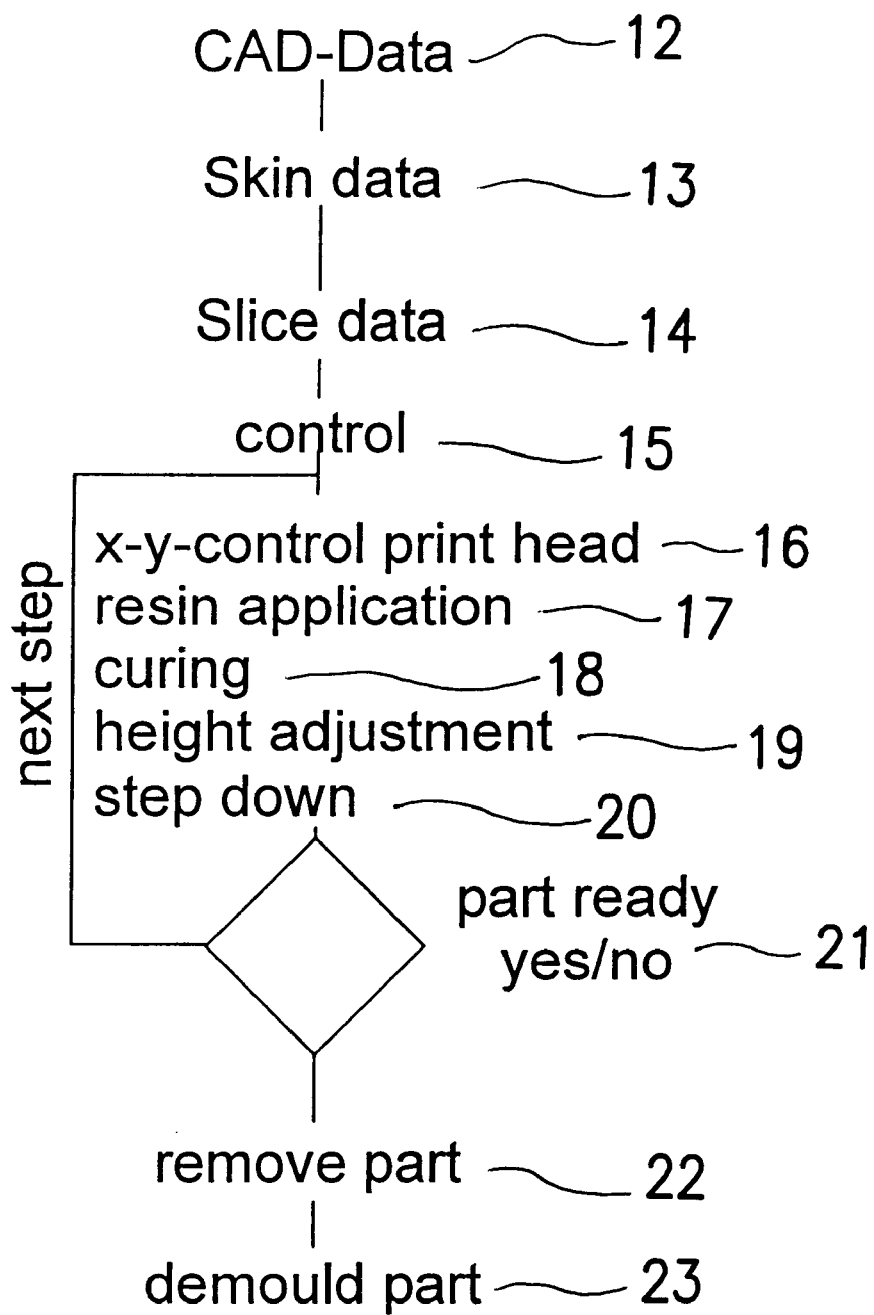
FIG. 3 shows a process chart.

FIG. 3 schematically shows the sequence of the data flow of the process. First, the data of the thin-walled shell 13 around the three-dimensional body are calculated from the CAD-data 12. For this purpose, in terms of data calculation, a thin-walled shell 13 is created covering the surface of the three-dimensional body, Further, in this step additional release patterns 5 are generated by checking for undercuts. Then, in the calculation process, only the release patterns 5 are cut into thin slices according to the layer thickness. Layer data 14 is obtained, which can be passed to the control device 15. This control device 15 controls the movement of the single-drop generator 4 over the building platform 1 according to the layer data 14, such that the release patterns are built. This is realised by means of the xy-control unit 16 of the single-drop generators 4. Then again, a filling step 17 of the resin material by means of the dosing device 8 is carried out. This step is followed by a hardening 18 of the resin.

Then, in step 19, the control device 15 adjusts the layer thickness by means of a tool 9. Then the building platform 1 is lowered in step 20. Then, in the control device 15 an enquiry 21 follows checking whether the three-dimensional body is completed, that is, whether all layer data 14 has been processed. If this is not the case, the control device 15 goes to the controlling of the single-drop generator 4, in order to start with the new layer. The process is repeated up to the enquiry 21. If by this enquiry 21 is found out, that the three-dimensional body 6 is completed, the process is terminated. Now, the three-dimensional body 6 can be taken off the building box 2 in step 22 and can be separated from other parts by removing the supporting parts along the release patterns 5 in step 23.

This separating from other parts can be simplified, if a water containing release agent is used for generating the release pattern 5. The whole three-dimensional body 6 can then be heated after taking it off the building box 2, e.g. by means of a micro wave furnace, such that the water abruptly evaporates and the thereby generated forces push apart the supporting parts from the three-dimensional body along the release patterns.

If not only one three-dimensional body is to be generated, since e.g. a small series of bodies is required, it is possible to use the supporting parts for producing a forming tool.

What is claimed is:

1. Method for producing a three-dimensional body, wherein the production of the three-dimensional body is carried out layer-wise, the method comprising:

selectively depositing two different materials in each layer to follow an exterior contour of the three-dimensional body in said layer, a first material of the different materials being a release material and a second material of the different materials being a building material for building-up the three-dimensional body, wherein, at first, the release material is selectively deposited in a shape of a line to form a thin-walled shell around the exterior contour of said three-dimensional body in the respective layer, whereafter the building material is deposited to fill remaining areas surrounded by the shell.

2. Method according to claim 1, wherein the three-dimensional body and a support body are produced in a layer-wise manner by depositing said building material inside and outside the thin-walled shell in each layer whereby a release joint between said three-dimensional body and said support body is generated by said thin-walled shell.

3. Method according to claim 1, wherein for generating closed or undercut cavities in the three-dimensional body, said release material is selectively deposited within the shell in each respective layer in a layer-wise manner to fill regions belonging to the cavity volume.

4. Method according to claim 1, wherein a wax material is used as said release material.

5. Method according to claim 1, wherein a cast resin is used as said building material.

6. Method according to claim 5, wherein deposition of the building material is carried out by flooding and subsequent removing of excess material.

7. Method according to claim 1, wherein a powder material is used as said building material.

8. Method according to claim 7, depositing said building material is carried out by spreading and stripping the building material.

9. Method according to claim 1, wherein the layer deposited last is evened and smoothed in connection with loosening material and the loosened material is removed.

10. Method according to claim 1, wherein said release material is deposited by means of a drop-on-demand printing head.

11. Method according to claim 1, wherein said building material comprises two components, each of which not hardening separately from the other, wherein said components are mixed before depositing the building material and the building material formed by the mixed components is hardened after the deposition of the building material.

12. Method according to claim 1, wherein said building material is hardened by whole-plane irradiation.

13. Method according to claim 1, wherein said three-dimensional body is built-up in a building box on a building platform and said building material is hardened by heat conduction through said building platform and said building box.

14. Method according to claim 1, wherein said building material is hardened by sintering.

15. Method according to claim 1, wherein said building material is hardened by applying gas.

16. Method according to claim 2, wherein the release material is deposited in each layer to additionally form a grid structure of release material outside the thin-walled shell, and the building material is deposited inside and outside the shell to fill remaining areas inside the thin-walled shell and between the grid structure.

17. Method for producing a three-dimensional body, wherein the three-dimensional body is divided into layers and produced layer-by-layer, the method comprising the following sequential steps for building each said layer:

depositing a first material to form a line-shaped shell defining a boundary of the three-dimensional body in said layer;

depositing a second material different from the first material, wherein the second material deposited in an area surrounded by the line-shaped shell is for building-up the three-dimensional body in said layer and the second material deposited outside the area surrounded by the line-shaped shell forms supporting material.

* * * * *